Figures 1, 2:
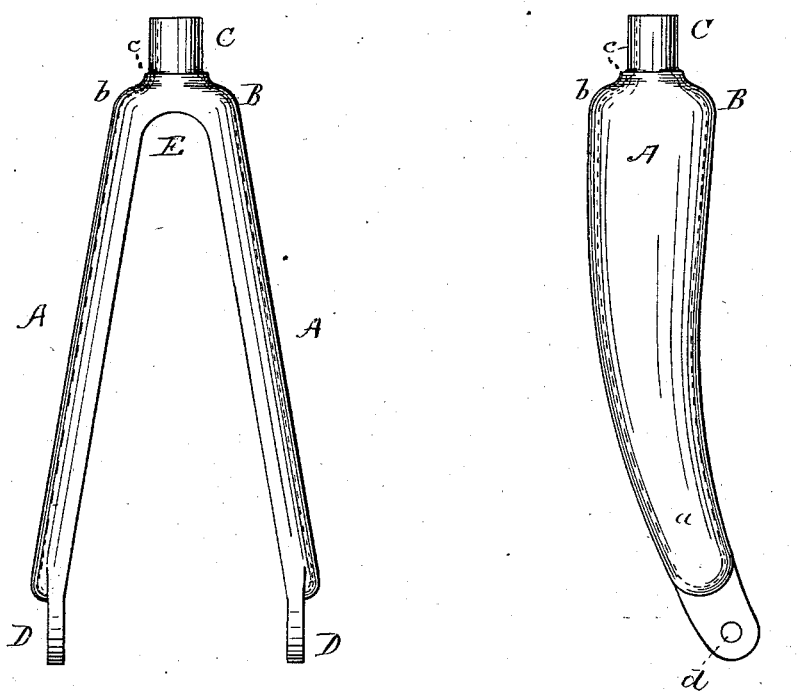

(No Model.)

J. KNOUS & A. E. WALLACE.
BICYCLE FORK.

No. 312,732.            Patented Feb. 24, 1885.

WITNESSES

E. P. J. Morton
Homer H. Fiske

INVENTOR

John Knous
Albert E. Wallace
By their Attorney
Charles E. Pratt

UNITED STATES PATENT OFFICE.

JOHN KNOUS AND ALBERT E. WALLACE, OF HARTFORD, CONNECTICUT, ASSIGNORS TO THE POPE MANUFACTURING COMPANY, OF SAME PLACE.

BICYCLE-FORK.

SPECIFICATION forming part of Letters Patent No. 312,732, dated February 24, 1885.

Application filed January 22, 1885. (No model.)

*To all whom it may concern:*

Be it known that we, JOHN KNOUS and ALBERT E. WALLACE, both of Hartford, Connecticut, have jointly invented certain new and useful Improvements in Bicycles, of which the following is a specification.

Our improvements relate more particularly to bicycles of metallic construction, and to that part of the frame of them known as the "rear fork;" and the nature of our invention will be apparent from the following description, taken in connection with the drawings, in which—

Figure 1 shows in rear elevation, and Fig. 2 in side elevation, a bicycle rear fork embodying our invention in one form.

Heretofore rear forks of bicycles of metallic construction, or that part of the frame which, extending from the backbone or perch, connects the latter with the rear or small wheel, have been made either by forging the head or bifurcated stub for connection with the rear end of the perch, and two forks for connecting this head with the rear wheel-pin or axle— one to be on either side of the wheel—and welding these forks or extensions to the head; or else by making the rear fork in two pieces— one for each side of the wheel; or in two or more pieces, with one or two for each side of the wheel, connected with it at the wheel-pin or axle and bolted or riveted to the perch; or by stamping out of sheet metal, or otherwise constructing a thin semi-tubular metal with two arms or forks—one for each side of the wheel—and having at their lower end additional pieces brazed on to form the lugs for the rear axles, and connecting above in the head or rounded shoulder with a slot in the center, and having another piece of metal to form a stub or tenon for the rear end of the perch inserted in said slot, and brazed or otherwise fastened to the said head to form secure connection of the perch.

Our improved fork is constructed throughout of one homogeneous piece of metal without weldings or brazings, and without excess of metal in any portion, by striking up from sheet metal or in any other approved manner known to the art in such proportions and distribution as to be stiff and strong and of appropriate size and shape, and of extreme lightness.

A A are the arms or branches of the fork, preferably larger at the upper end, where they form the arches E—one for either side of the rear wheel—the rim and tire of which revolve under the arches E. These arms A A are preferably also made of curved cross-section for strength and rigidity, and smaller at the lower end and with a curve backward, as at *a*, for beauty or grace of structure.

B is the part of the fork forming the head, preferably of cylindrical form, with a rounded shoulder, *b*.

C is the part forming a stud or tenon, by means of which the rear fork is to be attached to the perch, and is preferably made with a small rectangular shoulder, *c*, of about the thickness of the tube of the perch to be used.

D D are the parts of the fork forming the lugs for the axle of the rear wheel, which may be inserted in the slots *d*.

We preferably make our improved fork of sheet-steel or of tube, or it may be made of malleable iron, or of any other metal, as desired.

We also have an improved and novel process of making this improved rear fork, which we do not describe or claim in this application, as we have set it forth in another application for patent thereon.

We claim as new and of our invention—

An improved bicycle rear fork in one integral piece of metal, having a substantially cylindrical shoulder, from which branch two arms formed into lugs at their free ends for the wheel-pin, and having a substantially cylindrical tenon for the perch, essentially as set forth.

JNO. KNOUS.
ALBERT E. WALLACE.

Witnesses:
A. J. WELLES,
I. J. POST.